(12) United States Patent
Tateishi et al.

(10) Patent No.: US 6,856,857 B2
(45) Date of Patent: Feb. 15, 2005

(54) METHOD AND SYSTEM FOR PLANNING DISASSEMBLY AND PRODUCTION OF RECYCLABLE PRODUCTS AND FOR PLANNING PROCUREMENT OF PARTS FOR PRODUCTION

(75) Inventors: Jun Tateishi, Yokohama (JP); Mitsuhiro Enomoto, Kamakura (JP); Kimitaka Tamura, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/746,664

(22) Filed: Dec. 23, 2003

(65) Prior Publication Data

US 2004/0210334 A1 Oct. 21, 2004

(30) Foreign Application Priority Data

Mar. 27, 2003 (JP) ........................................ 2003-086918

(51) Int. Cl.[7] .............................................. G06F 17/00
(52) U.S. Cl. ...................... 700/213; 700/106; 700/266; 235/375; 209/541; 705/29
(58) Field of Search .......................... 700/213, 95, 266, 700/97, 106; 235/375, 376; 209/541, 576, 583, 630, 702, 705

(56) References Cited

U.S. PATENT DOCUMENTS 5,965,858 A * 10/1999 Suzuki et al. ................ 235/375
6,305,546 B1 * 10/2001 Saunders et al. ............ 206/541
6,529,788 B1 * 3/2003 Tani et al. ..................... 700/97
6,633,795 B1 * 10/2003 Suzuki et al. ................ 700/213

OTHER PUBLICATIONS

Muller, J., Green cleaning the demands of environmental protiction are chanching the electronic industry, Sep. 11, 1995, Fraunhofer Inst. , on p. 77–82.*

* cited by examiner

*Primary Examiner*—Kidest Bahta
(74) *Attorney, Agent, or Firm*—Townsend and Townsend and Crew LLP

(57) ABSTRACT

A system and method for generating disassembly, procurement and production plans dealing with recyclable parts and products are provided. Production demand information on products to be manufactured, collection schedule information on individual used products and recyclable part table on recyclable parts contained in the used products are stored in memory; recyclable part availability information is generated by referring to the collection schedule information and the recyclable part table; and by referring to the production demand information and the recyclable part availability information, a disassembly plan on the recyclable parts is created based on the production demand. Further, the production demand information and the recyclable part availability information are referenced to generate a procurement plan on parts and materials that cannot be fully supplied from available, recyclable parts alone. Based on the disassembly and procurement plans, a production plan is created.

10 Claims, 12 Drawing Sheets

| PARENT | CHILD | COMPOSITIONAL QUANTITY |
|---|---|---|
| PRODUCT X | INTERMEDIATE COMPONENT A | 1 |
| PRODUCT X | INTERMEDIATE COMPONENT B | 1 |
| INTERMEDIATE COMPONENT A | PART a | 2 |
| INTERMEDIATE COMPONENT B | INTERMEDIATE COMPONENT D | 1 |
| INTERMEDIATE COMPONENT D | PART b | 1 |

| ITEM | DISASSEMBLY LEAD TIME |
|---|---|
| PRODUCT X | 1 |
| INTERMEDIATE COMPONENT A | 1 |
| INTERMEDIATE COMPONENT B | 1 |
| INTERMEDIATE COMPONENT D | 1 |

| PARENT | CHILD | COMPOSITIONAL QUANTITY |
|---|---|---|
| PRODUCT P | INTERMEDIATE COMPONENT A | 1 |
| PRODUCT P | INTERMEDIATE COMPONENT C | 1 |
| INTERMEDIATE COMPONENT A | PART a | 2 |
| INTERMEDIATE COMPONENT C | PART b | 5 |
| INTERMEDIATE COMPONENT C | PART c | 1 |

| ITEM | PRODUCTION LEAD TIME |
|---|---|
| PRODUCT P | 1 |
| INTERMEDIATE COMPONENT A | 1 |
| INTERMEDIATE COMPONENT C | 1 |

FIG.8

| COLLECTED PRODUCT | QUANTITY IN STOCK |
|---|---|
| PRODUCT X | 0 |

| PRODUCT TO BE COLLECTED | SCHEDULED COLLECTION DATE | SCHEDULED COLLECTION QUANTITY |
|---|---|---|
| PRODUCT X | 1ST DAY | 15 UNITS |

FIG.9

| ITEM | QUANTITY IN STOCK |
|---|---|
| PRODUCT P | 5 |
| INTERMEDIATE COMPONENT C | 1 |

| PROCURED PART | AVAILABLE DATE | QUANTITY |
|---|---|---|
| PART b | 3RD DAY | 2 UNITS |

FIG.10

| No. | ITEM | AVAILABLE DATE | QUANTITY | FINALIZED QUANTITY | PARENT-SIDE EXCLUSION RELATION | | CHILD-SIDE EXCLUSION RELATION | |
|---|---|---|---|---|---|---|---|---|
| | | | | | EXCLUSION RELATION No. | COMPOSITIONAL QUANTITY | EXCLUSION RELATION No. | COMPOSITIONAL QUANTITY |
| 0001 | PRODUCT X | 1ST DAY | 15 UNITS | 0 | | | 0002 | 1 |
| 0002 | INTERMEDIATE COMPONENT A | 2ND DAY | 15 UNITS | 0 | 0001 | 1 | 0003 | 1 |
| 0003 | INTERMEDIATE COMPONENT B | 2ND DAY | 15 UNITS | 0 | 0001 | 1 | 0004 | 2 |
| 0004 | PART a | 3RD DAY | 30 UNITS | 0 | 0002 | 2 | 0005 | 1 |
| 0005 | INTERMEDIATE COMPONENT D | 3RD DAY | 15 UNITS | 0 | 0003 | 1 | 0006 | 1 |
| 0006 | PART b | 4TH DAY | 15 UNITS | 0 | 0005 | 1 | | |

FIG.11

| DISASSEMBLY ITEM | DATE | QUANTITY |
|---|---|---|
| PRODUCT X | 1ST DAY | 5 UNITS |

FIG.12

| DISASSEMBLY ITEM | DATE | QUANTITY |
|---|---|---|
| PRODUCT X | 1ST DAY | 5 UNITS |
| INTERMEDIATE COMPONENT D | 3RD DAY | 15 UNITS |
| INTERMEDIATE COMPONENT B | 2ND DAY | 15 UNITS |
| PRODUCT X | 1ST DAY | 10 UNITS |

FIG.13

| PROCUREMENT PART | DATE | QUANTITY |
|---|---|---|
| PART b | 4TH DAY | 3 UNITS |
| PART c | 4TH DAY | 4 UNITS |

FIG.16

| PRODUCT TO BE MANUFACTURED | REQUIRED DATE | REQUIRED QUANTITY |
|---|---|---|
| PRODUCT P | 6TH DAY | 10 UNITS |

METHOD AND SYSTEM FOR PLANNING DISASSEMBLY AND PRODUCTION OF RECYCLABLE PRODUCTS AND FOR PLANNING PROCUREMENT OF PARTS FOR PRODUCTION

BACKGROUND OF THE INVENTION

The present invention relates to a plan for disassembling a recyclable product, a plan for producing the recyclable product and a plan for procuring parts and materials for the manufacture of the recyclable product. More specifically, the present invention relates to a plan to break up a collected, recyclable product according to a production plan, a production plan using parts and materials obtained from the disassembly, and a plan to procure parts and materials for the production.

With a public concern over environmental problems growing year by year, environmentally aware manufacturing companies are building a system that, rather than disposing of used products, collects and recycles them to reduce an environmental burden. As for the recycling of a used product, a method has been proposed which involves attaching information to the product, reading the information attached to the product, referencing a database on recycle information prepared in advance and creating a recycling procedure for that product.

A system has also been proposed which determines the quantities of recyclable products, parts and materials by checking information on the quantity of collected, used products and on whether recyclable parts are mounted in the collected, used products. This system can incorporate additional information on inspection of the collected parts and thereby improve an accuracy with which to determine the quantities of recyclable products, parts and materials.

Of these proposed method and system, the former is an invention that simply determines a recycling procedure for each product. The latter checks the information on the collected products to determine the quantities of recyclable parts and materials and create a production plan. None of these prior arts considers recycling the collected, used products according the requirements of the production plan. That is, they do not determine when or to which stage the collected, used products are to be broken up. There is no feedback from the production plan to the disassembling plan and it is assumed that the collected products are to be broken up completely.

In terms of minimizing an environmental burden during the recycling process, it is important to recycle as many parts of the collected, used products as possible and to recycle intermediate components at as high an integration level as possible without performing unnecessary dismantling works.

SUMMARY OF THE INVENTION

Under these circumstances there has been a growing call for a disassembly plan that minimizes the amount of work for disassembling used products while enhancing a recycle rate of parts and materials contained in the collected, used products, and also for production and procurement plans that match the disassembly plan.

To meet this demand, the present invention stores in memory production demand information on products to be manufactured, collection schedule information for each used product and a table of recyclable parts contained in these used products, refers to the collection schedule information and the recyclable part table to create a recyclable part availability information and generate a recyclable part disassembly plan according to production demands by referencing the production demand information and the recyclable part availability information.

Further, for usable, recyclable parts this invention checks the production demand information and the recyclable part availability information to generate a procurement plan on parts and materials that are in short supply.

Further, this invention generates a production plan based on the disassembly plan and the procurement plan.

Other objects, features and advantages of the invention will become apparent from the following description of the embodiments of the invention taken in conjunction with the accompanying drawings.

BRIEF DESCRIPTION OF THE DRAWINGS

FIG. 8 is a table showing the number of collected products X in stock and the number of products scheduled to be collected.

FIG. 9 is a table showing the number of products in stock and the number of products scheduled to be stocked.

FIG. 10 is a table showing a stock schedule based on a recycling process.

FIG. 11 is a table showing the number of products to be disassembled.

FIG. 12 is a table showing the numbers of products, intermediate components and parts planned to be disassembled.

FIG. 13 is a table showing the numbers of components planned to be newly procured.

FIG. 16 is a table showing the number of products P required to be manufactured and a required date of completion.

DESCRIPTION OF THE EMBODIMENTS

Now, embodiments of the present invention will be explained by referring to the accompanying drawings.

First, a flow of product manufacturing and recycling processes will be described with reference to FIG. 1 and FIG. 2.

Figure 1:
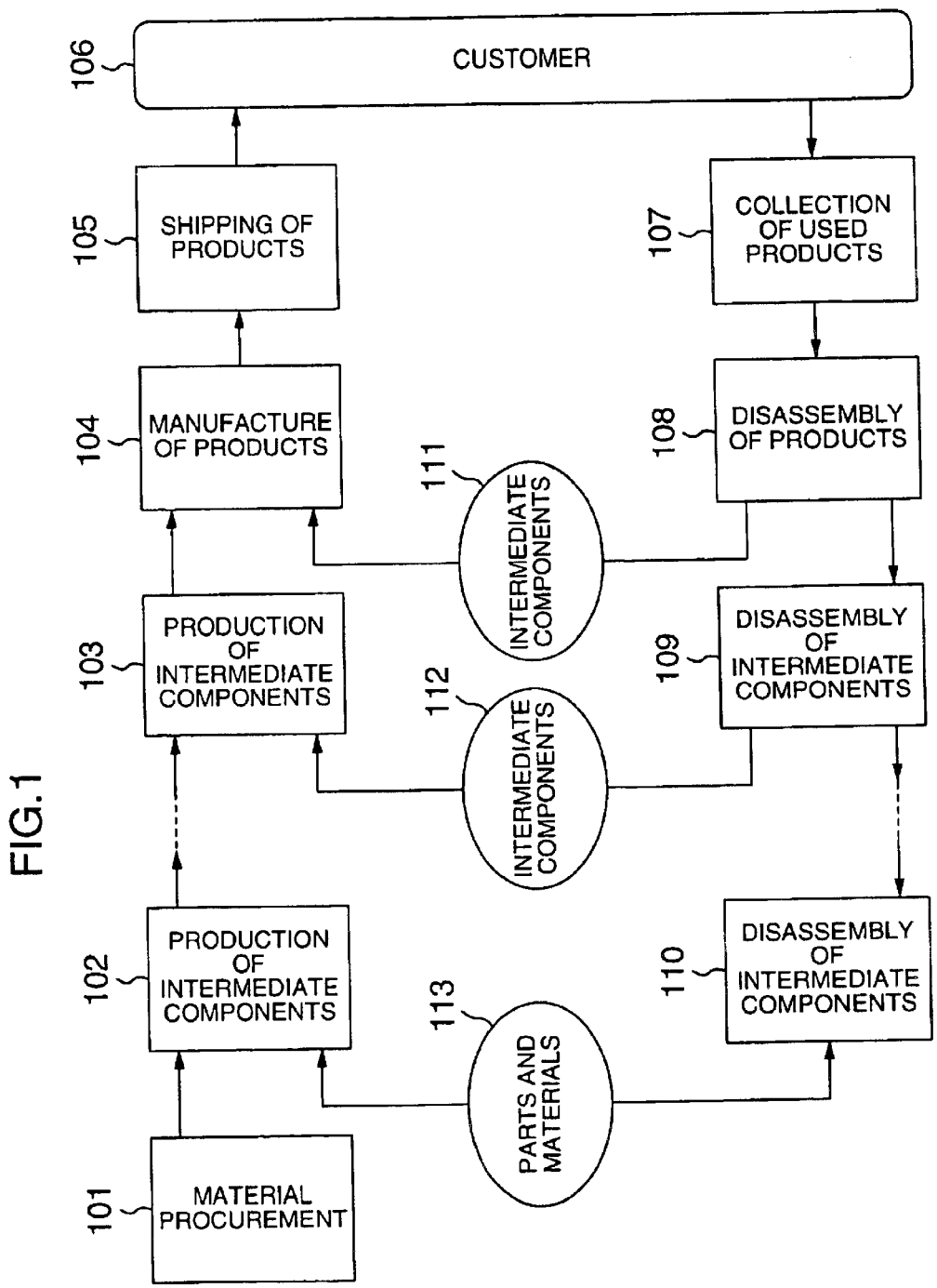
FIG. 1 is a diagram showing a flow of production and recycling of a product.

FIG. 1 illustrates a flow of production and recycling.

Figure 2:
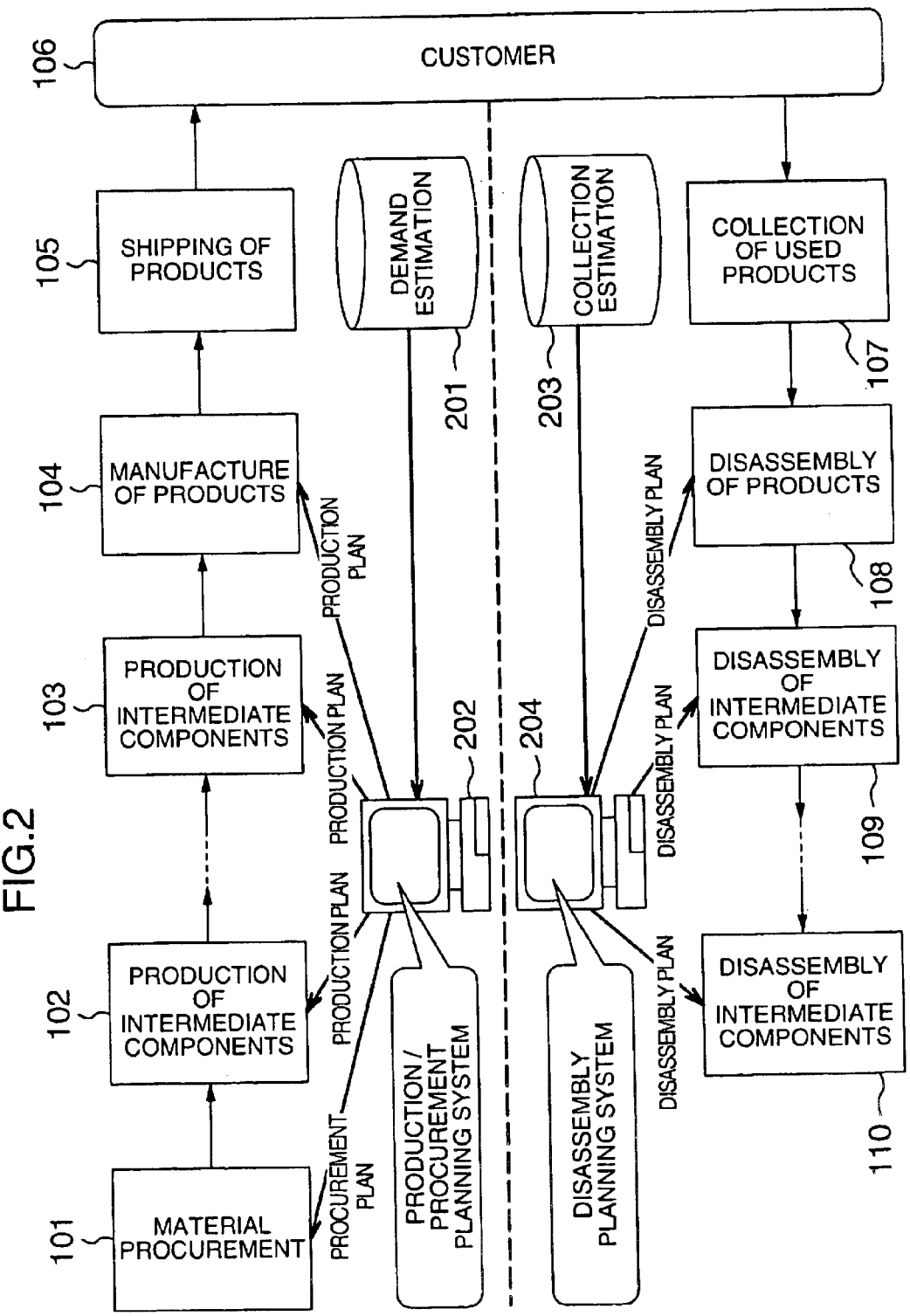
FIG. 2 is a functional overview of a production planning system and a recycle planning system.

FIG. 2 is a functional overview of production and recycle planning systems.

A company that manufactures products first procures parts making up the products (101), manufactures intermediate components from the parts supplied (102), and then combines the intermediate components into higher integration level intermediate components (103). The intermediate components are then assembled to make a product (104), which is delivered (105) to a customer (106). After having been used by the user, the product is collected (107). The used product is disassembled into intermediate components and into parts (108–110).

In recycling a used article, it may be broken up into higher integration level intermediate components 111 for recycled use or into lower integration level intermediate components 112 or even individual parts 113. Recycling the used article at as high an intermediate component integration level as possible provides an advantage of a reduced number of disassembly steps. It is therefore desirable to recycle used articles at as high an integration level as possible. Generally, however, breaking up the used articles down to individual parts 113 tends to widen their use and therefore enhance a recyclability.

The procurement of parts, the manufacture of intermediate components and the manufacture of a product have conventionally been specified, as shown in FIG. 2, by a production and procurement planning system 202 according to a demand estimate 201 of a product to be manufactured. Independent of this process, a disassembly planning system 204 prepares a disassembly plan for a product and intermediate components according to a collection estimate 203 of a used product. In this configuration, it is not possible to determine to what degree the collected product should be broken up according to a production situation. The collected, used product is broken up into intermediate components or parts, as already determined, irrespective of the stage and the number of intermediate components and parts required by the production process.

Figure 3:
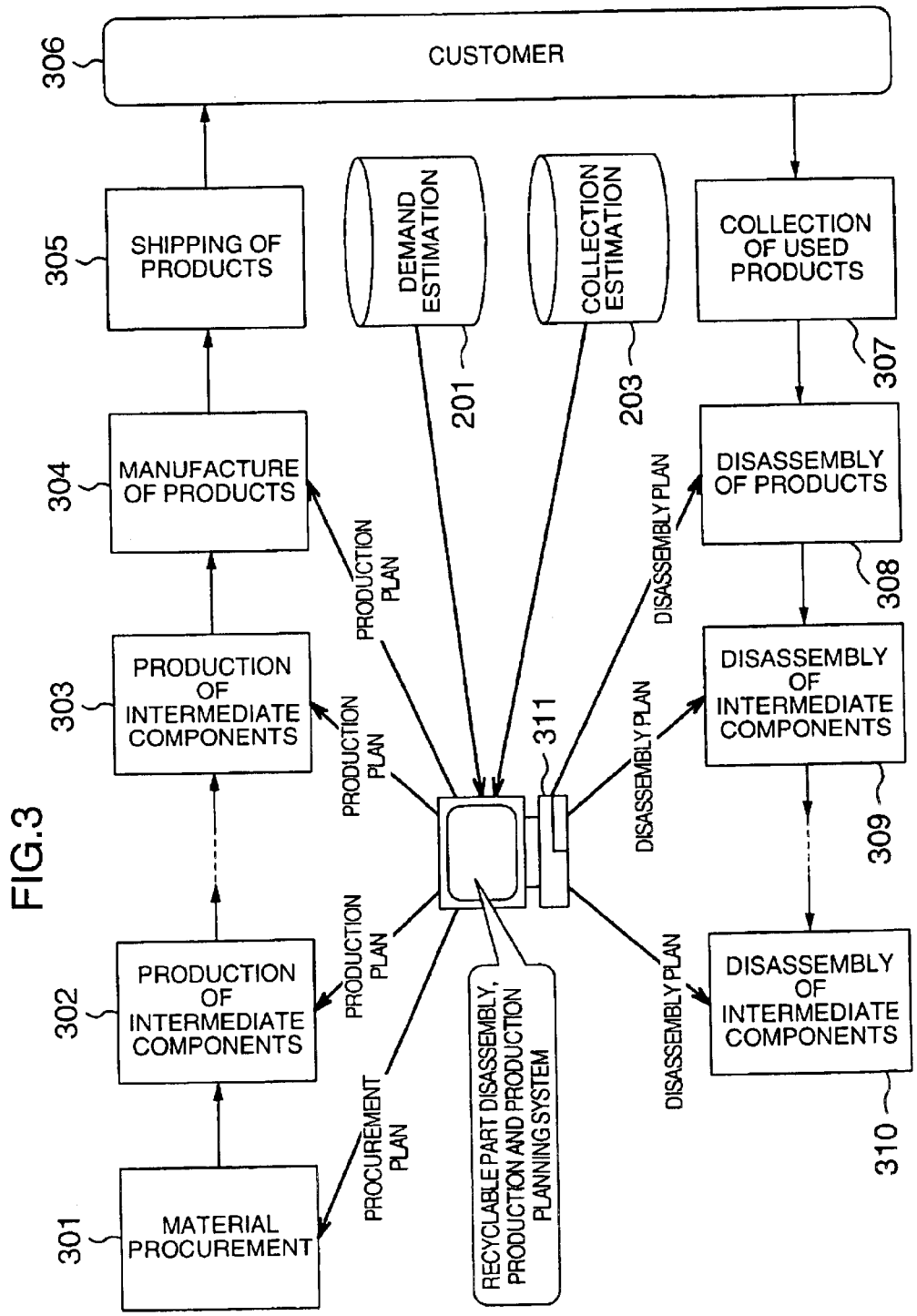
FIG. 3 is a functional overview of a disassembly, production and procurement planning system in one embodiment of the present invention.

FIG. 3 shows a functional overview of a disassembly, production and procurement planning system in one embodiment of the present invention.

As shown in FIG. 3, the disassembly, production and procurement planning system 311 generates a part procurement plan, a production plan for intermediate components and a product and a disassembly plan for a product and intermediate components according to a demand estimate information 201 on a product to be manufactured and a collection estimate information 203 on a used product, with these plans coordinated to be consistent with each other.

Generally, there are a plurality of kinds of products that are used and collected and also of products that are to be manufactured. Parts in each kind of product are multi-layered and very complex in construction. For easy understanding of this invention, the kinds of products and the parts configuration are simplified in the following detailed description. In real applications, the reader need only develop or expand the idea described below according to the parts configuration of the applicable product.

Figure 4:
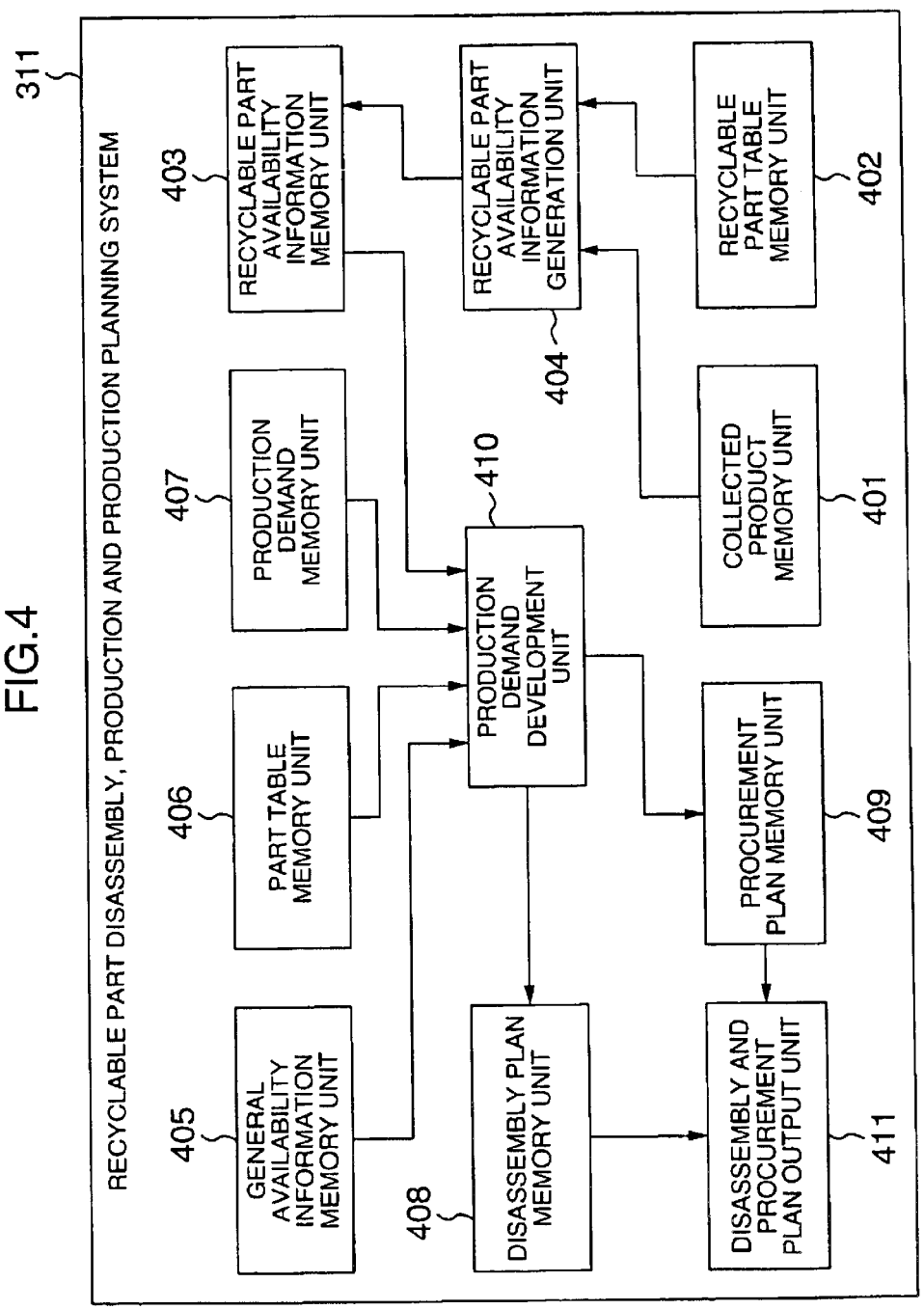
FIG. 4 is a diagram showing a configuration of a disassembly, production and procurement planning system in one embodiment of the present invention.

FIG. 4 shows a configuration of the disassembly, production and procurement planning system in one embodiment of this invention.

The disassembly, production and procurement planning system of this embodiment can be divided largely into three portions.

First portion generates a recyclable part stock schedule information according to information on collected, used product and also generates an exclusion relation between intermediate components and parts included in the recyclable part stock schedule information. The recyclable part stock schedule information represents a stock situation of each intermediate component and part that become available by breaking up the collected, used product. The exclusion relation is a relation between intermediate components and parts included in the recyclable part stock schedule information, indicating that, if a given intermediate component or part is used for production, the associated part or intermediate component can no longer be used. For intermediate components and parts included in the recyclable part stock schedule information, an exclusion relation is created. More specifically, if a certain product is broken up into intermediate components which are further broken up into parts and the parts are recycled to a production process, then the intermediate components which are upstream of the associated parts in the disassembly process are not available for recycled use. Therefore, an exclusion relation is set in the recyclable part stock schedule information between the parts and their associated intermediate components.

This portion comprises a collected product memory unit 401, a recyclable part table memory unit 402, a recyclable part availability information memory unit 403, and a recyclable part availability information generation unit 404.

The collected product memory unit 401 stores, for each kind of product, a quantity of collected products in stock and collection schedule information representing a scheduled collection date and a quantity of products to be collected. The recyclable part table memory unit 402 stores details of recyclable intermediate components and parts contained in each broken-up product and a breakup lead time. The recyclable part availability information memory unit 403 stores recyclable part stock schedule information representing an available date and quantity for each intermediate component and part that are made available upon breaking up the collected product and an exclusion relation assigned to individual, recyclable part stock schedule information that is made unusable after its use. Based on the collection schedule information and the quantity of collected products in stock stored in the collected product memory unit 401 and on the details of recyclable intermediate components and parts contained in a broken-up product and a breakup lead time stored in the recyclable part table memory unit 402, the recyclable part availability information generation unit 404 generates the recyclable part stock schedule information representing an available date and quantity for each intermediate component and part that are made available upon breaking up the collected product and the exclusion relation assigned to individual, recyclable part stock schedule information that is made unusable after its use. The recyclable part availability information generation unit 404 then stores these generated information in the recyclable part availability information memory unit 403.

The second portion generates disassembly and procurement plans by checking the production demand information against the recyclable part stock schedule information, general stock schedule information and current stock information.

This portion comprises a general availability information memory unit 405, a part table memory unit 406, a production demand memory unit 407, a disassembly plan memory unit 408, a procurement plan memory unit 409, and a production demand development unit 410.

The general availability information memory unit 405 stores quantities of parts, intermediate components and products in stock and general stock schedule information representing an available date when each part becomes available as a result of procurement and a quantity of each part. The part table memory unit 406 stores details of parts making up each product and a production lead time. The production demand memory unit 407 stores production demand information representing a requested completion date and quantity of products. The disassembly plan memory unit 408 stores a scheduled disassembly date and quantity of products and intermediate components. The procurement plan memory unit 409 stores a date when a part needs to be procured and a quantity. The production demand development unit 410 refers to the production demand information stored in the production demand memory unit 407 and the details of parts for each product and the production lead time stored in the part table memory unit 406 and then calculates requirement information on a date when a part or intermediate component one level down in the part table needs to be completed and a quantity of that part. The requirement information is then filled by the recyclable part stock schedule information stored in the recyclable part availability information memory unit 403 and the general stock schedule information and stock stored in the general availability information memory unit 405, in that order. When allocating the recyclable part stock schedule information, an operation is also performed to trace an exclusion relation between the quantity allocated and the quantity scheduled to be stocked which is stored in the recyclable part availability information memory unit 403, and then subtract the allocated quantity from the quantity scheduled to be stocked. The exclusion relation is also traced to the parent side of those parts scheduled to be stocked which were allocated to the requirement information, and the reduced quantities of the recyclable parts scheduled to be stocked and the associated scheduled stock dates and items are registered with the disassembly plan memory unit 408. For those required intermediate components that failed to be filled, requirement information on parts or intermediate components one level down in the part table is calculated and filled with available parts. If these requirements still fail to be filled, information on the required parts, dates and quantities is added to the procurement plan memory unit 409.

The third portion outputs the generated disassembly and procurement plans and this function is executed by a disassembly and procurement plan output unit 411 which outputs the disassembly plan stored in the disassembly plan memory unit 408 and the procurement plan stored in the procurement plan memory unit 409.

Next, referring to FIG. 5 to FIG. 16, the operation performed by the disassembly, production and procurement planning system 311 as one embodiment of this invention will be described in detail.

In this embodiment, the expression of "first day" is meant to be the day that a plan of interest is initiated.

Figure 6:
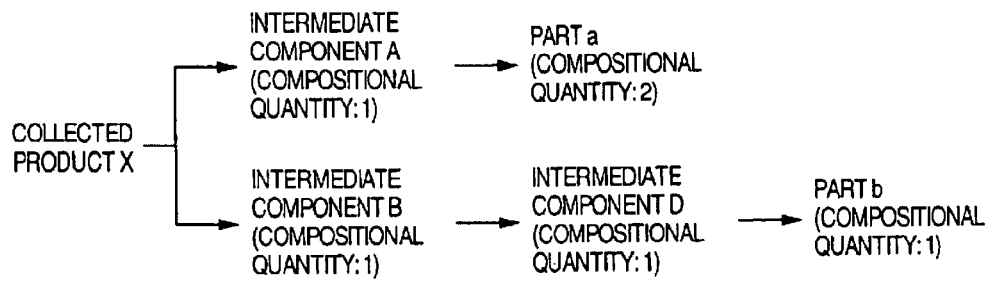
FIG. 6 illustrates an example configuration (partial) of a used product X handled in this embodiment.

FIG. 6 shows an example configuration (partial) of a used product X to be handled in this embodiment.

As shown in FIG. 6, the collected, used product X to be handled in this embodiment can be broken up into two intermediate components, an intermediate component A (compositional quantity: 1) and an intermediate component B (compositional quantity: 1). Their disassembly lead times are assumed to be one day. The intermediate component A can further be broken up into parts a (compositional quantity: 2). The lead time of this disassembly is one day. The intermediate component B can be broken up into another intermediate component D (compositional quantity: 1) and its disassembly lead time is one day. The intermediate component D can further be disassembled into a part b (compositional quantity: 1) and its disassembly lead time is one day. FIG. 6 does not show intermediate components and parts that are not used in the description of this embodiment. Data shown in FIG. 6 is stored in the recyclable part table memory unit 402.

Figure 7:
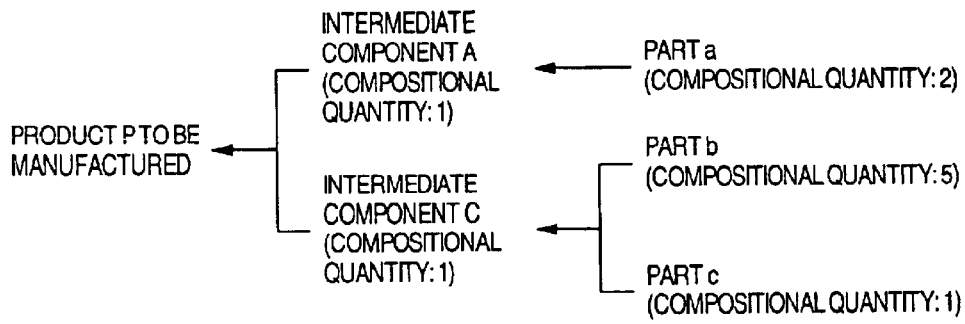
FIG. 7 illustrates an example configuration (partial) of a product P to be manufactured in this embodiment.

Next, FIG. 7 shows an example configuration (partial) of a manufactured product P to be handled in this embodiment.

As shown in FIG. 7, the manufactured product P of this embodiment includes two intermediate components A (compositional quantity: 1) and C (compositional quantity: 1), and its production lead time is one day. The intermediate component A contains parts a (compositional quantity: 2) and its production lead time is one day. The intermediate component C comprises parts b (compositional quantity: 5) and a part c (compositional quantity: 1) and its production lead time is one day. Data shown in FIG. 7 is stored in the part table memory unit 406.

FIG. 8 shows example numbers of collected, used products in stock and of used products planned to be collected.

As shown in FIG. 8, the number of collected, used products in stock is zero; 15 units of used product X are scheduled to be collected on the first day; and the data shown in FIG. 8 is stored in the collected product memory unit 401. As shown in FIG. 16, 10 units of manufactured product P are scheduled to be completed on the sixth day and the data shown in FIG. 16 is stored in the production demand memory unit 407.

FIG. 9 shows example numbers of manufactured products P in stock and of parts planned to be procured.

As shown in FIG. 9, there are five units of product P and one intermediate component C in stock. As a result of procurement, two parts b will be available on the third day. Data shown in FIG. 9 is stored in the general availability information memory unit 405.

Next, by referring to FIG. 5, FIG. 14 and FIG. 15, a process flow of the disassembly, production and procurement planning system will be described.

Figure 5:
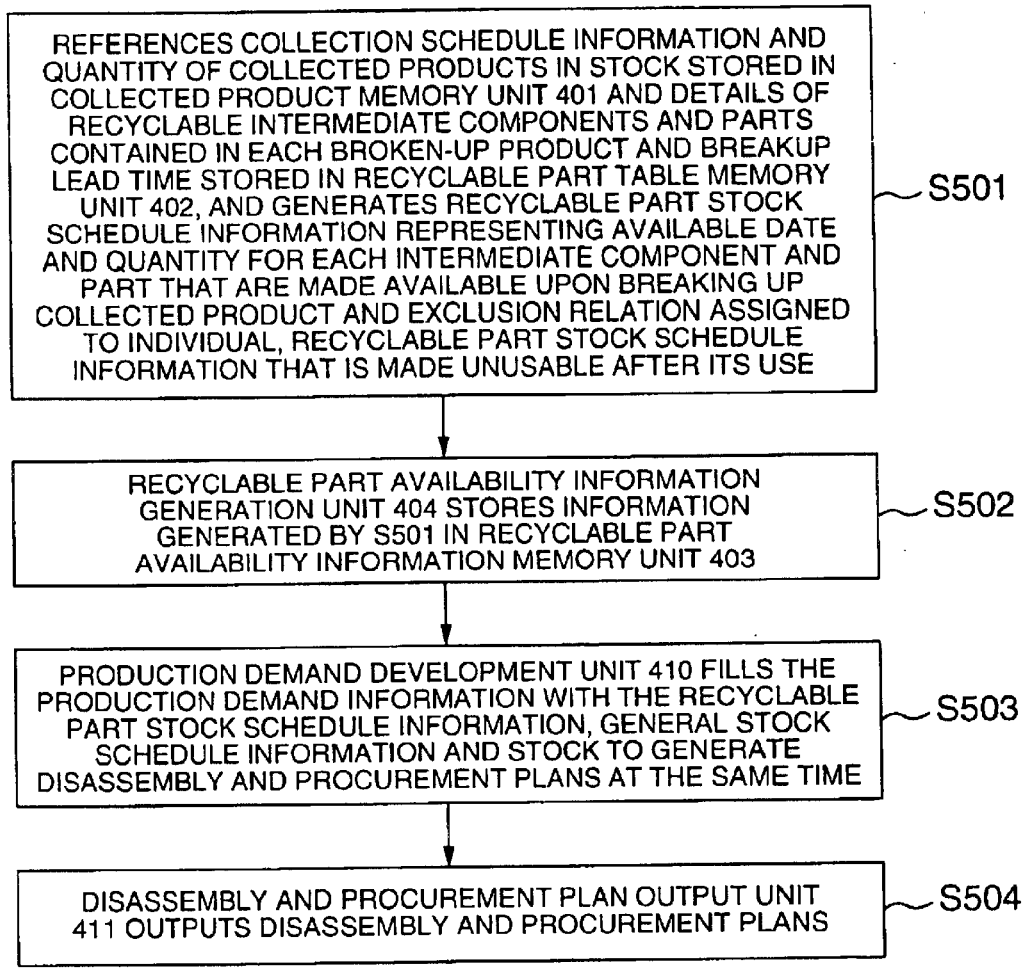
FIG. 5 is diagram showing a process flow of a disassembly, production and procurement planning system in one embodiment of the present invention.
Figure 14:
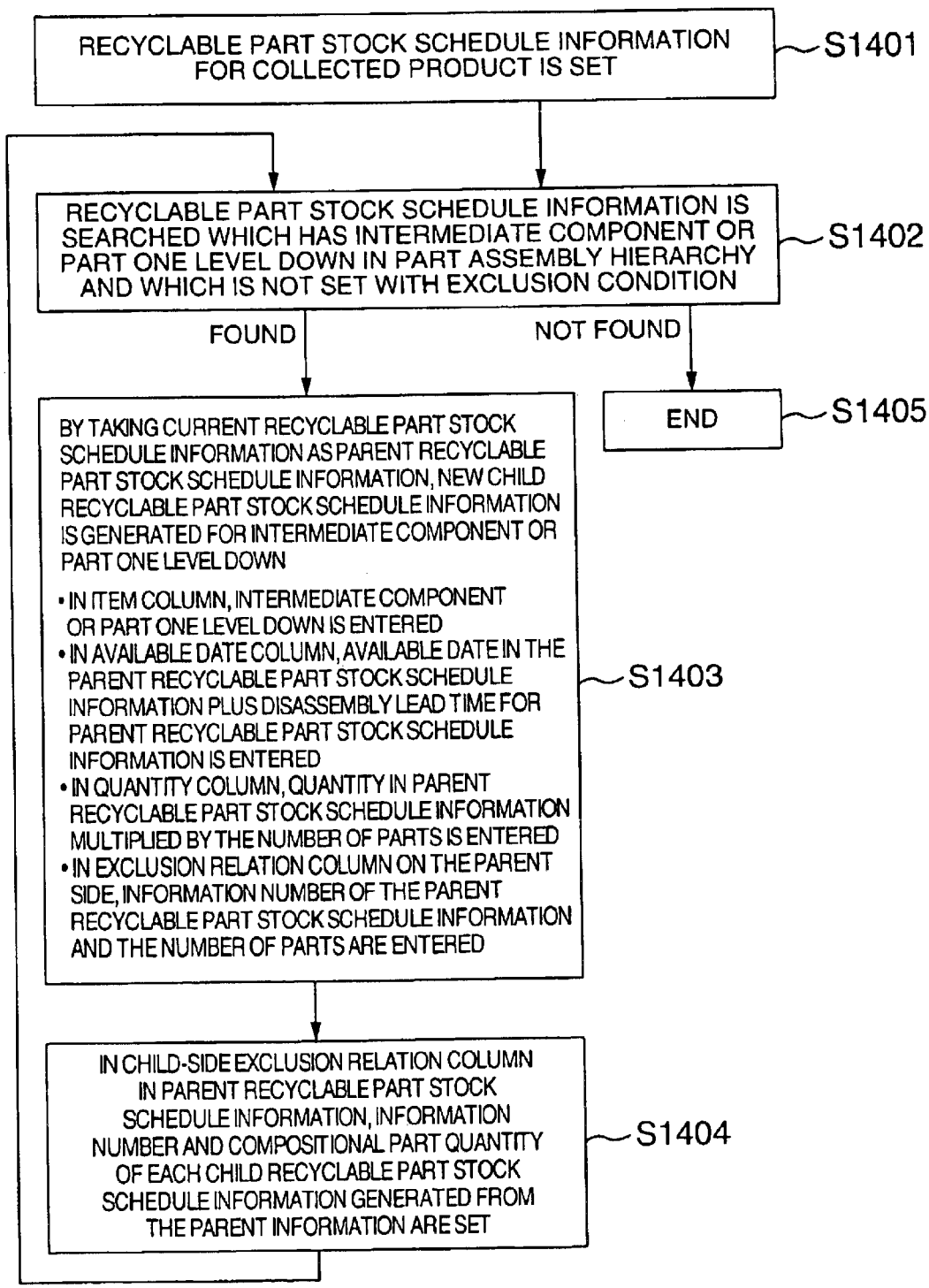
FIG. 14 is a diagram showing a process flow of a disassembly, production and procurement planning systems in one embodiment of this invention.
Figure 15:
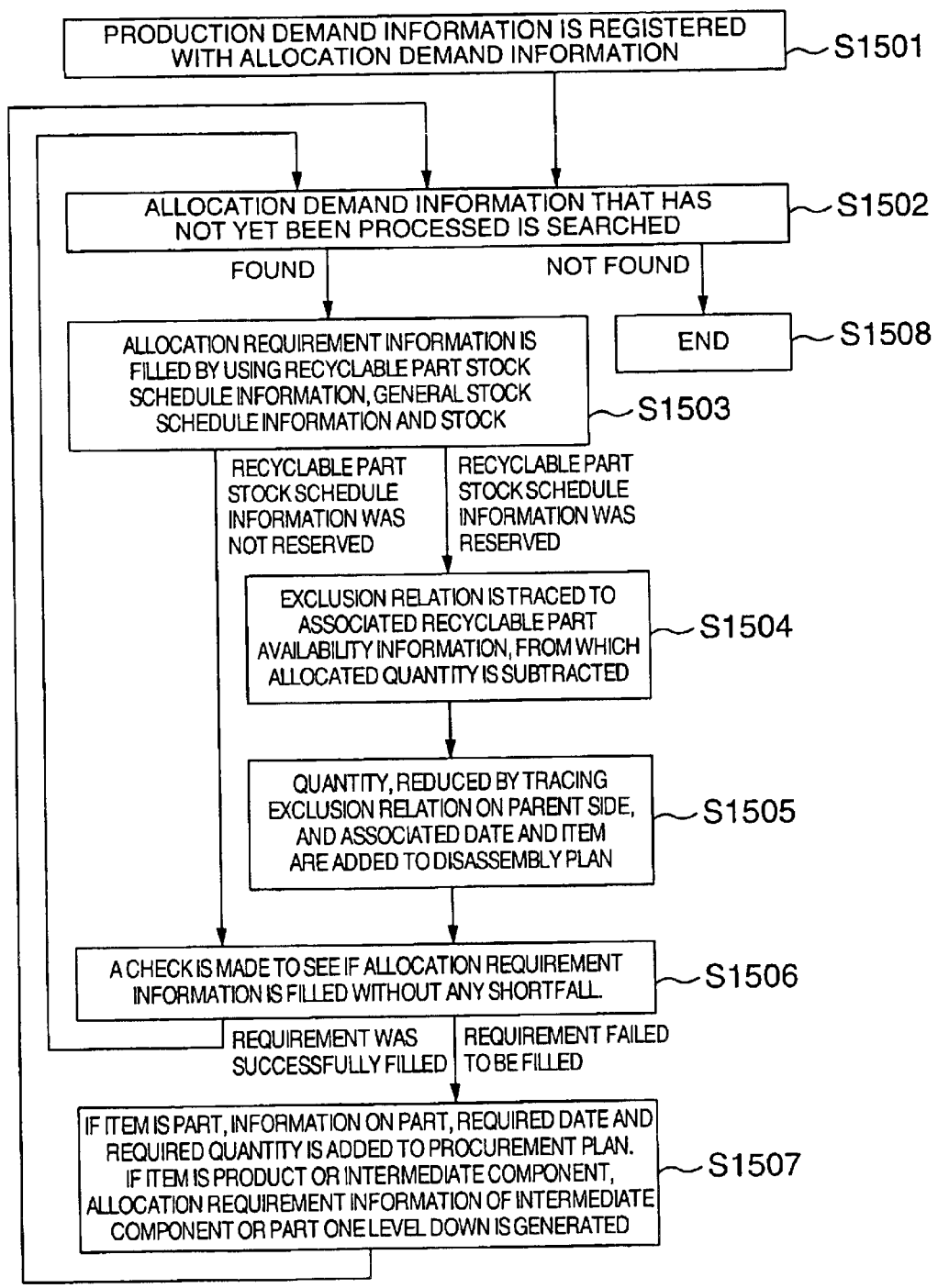
FIG. 15 is a diagram showing a process flow of a disassembly, production and procurement planning system in one embodiment of this invention.

FIG. 5, FIG. 14 and FIG. 15 illustrates the process flow of the disassembly, production and procurement planning system in one embodiment of this invention.

The recyclable part availability information generation unit 404 references the collection schedule information and the quantity of collected products in stock stored in the collected product memory unit 401 and details of recyclable intermediate components and parts contained in each broken-up product and a breakup lead time stored in the recyclable part table memory unit 402, and generates recyclable part stock schedule information representing an available date and quantity for each intermediate component and part that are made available upon breaking up the collected product and an exclusion relation assigned to individual, recyclable part stock schedule information that is made unusable after its use (S501).

The procedure for setting the recyclable part stock schedule information and the exclusion relation will be explained by referring to FIG. 14.

The recyclable part stock schedule information comprises an information number, item, available date, quantity, finalized quantity, exclusion relation on parent side in a part assembly hierarchy, and exclusion relation on child side in the part assembly hierarchy. First, recyclable part stock schedule information for a collected product is set (S1401). Since the planned product collection is "15 units of product X on the first day", the recyclable part stock schedule information 0001 is filled with a product X in the item column, the first day in the available date column and 15 units in the quantity column. Then, recyclable part stock schedule information is searched which has an intermediate component or part one level down in the part assembly hierarchy and which is not set with an exclusion condition (S1402). Here, recyclable part stock schedule information that meets this condition is information number 0001. Thus, by taking this recyclable part stock schedule information as parent recyclable part stock schedule information, new child recyclable part stock schedule information is generated for an intermediate component or part one level down. At this time, what should be entered in the item column is an intermediate component or part one level down; what should be entered in the available date column is the available date in the parent recyclable part stock schedule information plus the disassembly lead time for the parent recyclable part stock schedule information; what should be entered in the quantity column is the quantity in the parent recyclable part stock schedule information multiplied by the compositional quantity of parts; and what should be entered in the exclusion relation column on the parent side is the information number of the parent recyclable part stock schedule information and the compositional quantity of parts (S1403). Here, the recyclable part stock schedule information 0001 concerns a product X. The product X comprises an intermediate component A (compositional quantity: 1) and an intermediate component B (compositional quantity: 1) and the disassembly lead time of the product X is one day. Thus, new recyclable part stock schedule information 0002 and 0003 are created. The new recyclable part stock schedule information 0002 is set with the intermediate component A in the item column, the second day (1+1) in the available date column, 15 units (15×1) in the quantity column, and 0001 as an exclusion number and 1 as a part quantity in the parent-side exclusion relation column. The new recyclable part stock schedule information 0003 is set with the intermediate component B in the item column, the second day (1+1) in the available date column, 15 units (15×1) in the quantity column, and 0001 as an exclusion number and 1 as a compositional part quantity in the parent-side exclusion relation column. Further, in the parent recyclable part stock schedule information, two child recyclable part stock schedule information numbers generated from the parent information and their part compositional quantities are set in the child-side exclusion relation column (S1404). Here, the child-side exclusion relation column of the recyclable part stock schedule information 0001 is set with 0002 as exclusion number and 1 as compositional part quantity and with 0003 as exclusion number and 1 as compositional part quantity. Similarly, new recyclable part stock schedule information is successively created from the recyclable part stock schedule information 0002 and 0003, as shown in FIG. 10.

The recyclable part availability information generation unit 404 stores the recyclable part stock schedule information and the exclusion relation in the recyclable part availability information memory unit 403 (S502). Next, the production demand development unit 410 fills the production demand information with the recyclable part stock schedule information, general stock schedule information and stock to generate disassembly and procurement plans at the same time (S503).

This demand filling procedure will be explained by referring to FIG. 15. Allocation requirement information consists of an information number, item, required date, required quantity, allocated quantity, and state of allocation. First, the production demand development unit 410 registers the production demand information with the allocation requirement information (S1501). Here, since there is production demand information requesting 10 units of product P to be completed on the sixth day, the registered allocation requirement information has 0001 entered in the information number column, product P in the item column, sixth day in the required date column, 10 units in the required quantity column, 0 unit in the allocated quantity column and unallocated state in the allocation state column. Next, the production demand development unit 410 searches for allocation requirement information that has not yet been processed (S1502).

Here, the search picks up allocation requirement information 0001.

Next, the allocation requirement information is processed. That is, the allocation requirement information is filled by using recyclable part stock schedule information, general stock schedule information and stock (S1503). Since there are five units of product P in stock, these five units are used to fill the allocation requirement. Because the recyclable part stock schedule information was not allocated, a check is made to see if the allocation requirement information has been filled without any shortfall (S1506). The check finds that the allocation requirement is not filled, with the allocated quantity falling five units short of the requirement, so new allocation requirement information is generated for intermediate components or parts one level down. The product P comprises an intermediate component A (compositional quantity: 1) and an intermediate component C (compositional quantity 1).

Here, the production lead time of the product P is one day. Thus allocation requirement information is generated which has 0002 in the information number column, intermediate component A in the item column, fifth day in the required date column, five unit in the required quantity column, zero unit in the allocated quantity column, and unallocated state in the allocation state column. Another allocation requirement information is also generated which has 0003 in the information number column, intermediate component C in the item column, fifth day in the required date column, five unit in the required quantity column, zero unit in the allocated quantity column, and unallocated state in the allocation state column. The allocation requirement information 0001 is then updated to have product P as item, sixth day as required date, 10 units as required quantity, five units as allocated quantity, and allocated state as allocation state. Next, a search is made for allocation requirement information that has not yet been processed (S1502). Here, the search picks up allocation requirement information 0002.

Next, the allocation requirement information 0002 is processed (S1503). Referring to the recyclable part availability information memory unit 403, it is seen that all five units of intermediate component A in this allocation requirement information can be supplied from recyclable part stock schedule information 0002. Since the recyclable part stock schedule information was used, an exclusion relation is traced to the associated recyclable part availability information, from which the allocated quantity is subtracted (S1504). Here, since five unit in the recyclable part stock schedule information 0002 were used, an exclusion relation is traced to the parent side of the recyclable part stock schedule information 0002 to update the quantity in recyclable part stock schedule information 0001 by reducing it by five units (5×1) to 10 units.

Next, an exclusion relation is also traced to the child side, one level down, of the recyclable part stock schedule information 0001 and, in recyclable part stock schedule information on the child side other than 0002, i.e., in recyclable part stock schedule information 0003 a finalized quantity is increased by five unit. This means that, of the intermediate components that will become available from five units of product X determined to be broken up, the intermediate component A is already assigned to a particular use but the intermediate component B is not yet reserved. The exclusion relation is further traced to the child side and a quantity in recyclable part stock schedule information 0004 is reduced by 10 units (5×2) to 20 units. Then, the quantity, which was reduced by tracing the exclusion relation to the parent side, and the associated date and item are added to a disassembly plan (S1505).

Here, five units of product X, the quantity of which was reduced by tracing the exclusion relation to the parent side, and first day as the available date are added to the disassembly plan. Then a check is made to see if the allocation requirement information 0001 is filled without any shortfall (S1506). Because it is completely filled, the allocation requirement information 0002 is updated to intermediate component A as item, fifth day as required date, five units as required quantity, five units as allocated quantity, and allocated state as allocation state. Then returning to step S1502, allocation requirement information that has not yet been processed is searched. Here, allocation requirement information 0003 is picked up.

Next, the allocation requirement information 0003 is processed (S1503). One unit of intermediate component C can be supplied from stock. Since none of the recyclable part stock schedule information was used, a check is made to see if the allocation requirement information 0003 has been filled without any shortfall (S1506). The check finds that the requirement has failed to be filled, with the allocated quantity falling four units short of the requirement. Therefore, new allocation requirement information is created for intermediate components or parts one level down. The intermediate component C comprises parts b (compositional quantity: 5) and part c (compositional quantity: 1). The intermediate component C has a production lead time of one day. Thus, allocation requirement information is generated which has 0004 as information number, part b as item, fourth day as required date, 20 units as required quantity, zero unit as allocated quantity, and unallocated state as allocation state. Another allocation requirement information is also generated which has 0005 as information number, part c as item, fourth day as required date, four units as required quantity, zero unit as allocated quantity, and unallocated state as allocation state. The allocation requirement information 0003 is updated to intermediate component C as item, fifth day as required date, five units as required quantity, one unit as allocated quantity, and allocated state as allocation state.

Next, allocation requirement information that has not been processed is searched (S1502). The search picks up allocation requirement information 0004. Then, the allocation requirement information 0004 is processed (S1503). Referring to the recyclable part availability information memory unit 403, it is seen that 15 units of the required quantity of parts b can be supplied from recyclable part stock schedule information 0006. Further, two procured units of part b will be available from third day and thus are reserved for the allocation requirement information 0004.

Since the recyclable part stock schedule information has been used, the exclusion relation is traced and the allocated quantity is subtracted from the associated recyclable part availability information (S1504). Here, the exclusion relation is traced to the parent side and, based on the compositional quantity, 15 units (15×1) are subtracted from the quantity in the recyclable part stock schedule information 0005 to make it zero. The exclusion relation is further traced to the recyclable part stock schedule information 0003 on the parent side of the stock schedule information 0005, where, based on the compositional quantity, 15 units (15×1) are subtracted from the quantity to make it zero. Further the exclusion relation is traced to the recyclable part stock schedule information 0001 on the parent side, where, based on the compositional quantity, 15 units (15×1) are subtracted, i.e., five units from the finalized quantity and 10 units from the (scheduled) quantity to make both of them zero. Then, the quantities, which were reduced by tracing the exclusion relation to the parent side, the dates and the items are added to the disassembly plan (S1505). Here, information representing intermediate component D, 15 units and third day, information on intermediate component B, 15 units and second day, and information on product X, 10 units and first day are added to the disassembly plan.

Next, a check is made to see if the allocation requirement information has been filled without a shortfall (S1506). The check finds that the allocation requirement has failed to be filled, so three units by which the allocated quantity of parts b falls short of the requirement on the fourth day is added to the procurement plan memory unit 409. Next, allocation requirement information that has not yet been processed is searched (S1502). The search picks up allocation requirement information 0005. The allocation requirement information 0005 is now processed (S1503). Then, whether this allocation requirement information has successfully been filled is checked (S1506). The check finds that the allocation requirement has failed to be filled, so information on the part under consideration, required date and required quantity is added to the procurement plan (S1507). Here, information on part C as item, fourth day as required date and four units as required quantity is added to the procurement plan.

In a final step, the disassembly and procurement plan output unit 411 outputs to paper or display or as electronic data to a separate system the disassembly plan stored in the disassembly plan memory unit 408 as shown in FIG. 10 and the procurement plan stored in the procurement plan memory unit 409 as shown in FIG. 13 (S504).

As described above, according to a production demand, this embodiment can create a disassembly plan on a used product and a procurement plan on intermediate components, parts and materials obtained from used products through a recycling process. This makes it possible to recycle as many parts of the collected, used products as possible and to recycle intermediate components at as high an integration level as possible without performing unnecessary dismantling works. This in turn reduces a burden on environment.

Although in this embodiment the kinds of product and details of parts making up each product are simplified in the description for clarity, this invention can equally be applied to cases where there are a plurality of kinds of collected products and of products to be manufactured and where parts making up these products are multi-layered and complex.

This invention therefore can support a generation of a disassembly plan that minimizes the amount of work for disassembling used products while enhancing a recycle rate of parts and materials contained in the collected, used products, and also a generation of production and procurement plans that match the disassembly plan.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A disassembly plan generation system for creating a disassembly plan to disassemble collected, used products, the system comprising:
   a collection schedule information memory unit to store collection schedule information on each used product;
   a recyclable part table memory unit to store a recyclable part table showing recyclable parts contained in each used product;
   a production demand memory unit to store production demand information on products to be manufactured using the recyclable parts;
   a recyclable part availability information generation unit to generate recyclable part availability information on recyclable parts by referring to the collection schedule information and the recyclable part table and to store the recyclable part availability information in a recyclable part availability information memory unit; and
   a production demand development unit to generate a disassembly plan on recyclable parts based on a production demand by referring to the production demand information and the recyclable part availability information.

2. A procurement plan generation system according to claim 1, wherein the recyclable part availability information generation unit relates those recyclable parts to each other which, when used for the manufacture of a product, have an exclusion relation with each other in the recyclable part table, stores them in the recyclable part availability information memory unit, and manages the recyclable part availability information according to the exclusion relation.

3. A procurement plan generation system for creating a procurement plan to procure parts and materials for products to be manufactured, the system comprising:
   a production demand memory unit to store production demand information on products to be manufactured;
   a collection schedule information memory unit to store collection schedule information on each used product;
   a recyclable part table memory unit to store a recyclable part table showing recyclable parts contained in each used product;
   a recyclable part availability information generation unit to generate recyclable part availability information on recyclable parts by referring to the collection schedule information and the recyclable part table and to store the recyclable part availability information in a recyclable part availability information memory unit; and
   a production demand development unit to generate a procurement plan on parts and materials that cannot be fully supplied from available, recyclable parts alone by referring to the production demand information and the recyclable part availability information.

4. A disassembly plan generation system according to claim 1, wherein the recyclable part availability information generation unit relates those recyclable parts to each other which, when used for the manufacture of a product, have an exclusion relation with each other in the recyclable part table, stores them in the recyclable part availability information memory unit, and manages the recyclable part availability information according to the exclusion relation.

5. A production, procurement and disassembly plan generation system for creating production, procurement and disassembly plans on recyclable products, the system comprising:
   a production demand memory unit to store production demand information on products to be manufactured;
   a collection schedule information memory unit to store collection schedule information on each used product;
   a recyclable part table memory unit to store a recyclable part table showing recyclable parts contained in each used product;
   a recyclable part availability information generation unit to generate recyclable part availability information on recyclable parts by referring to the collection schedule information and the recyclable part table and to store the recyclable part availability information in a recyclable part availability information memory unit; and
   a production demand development unit to generate the disassembly plan on recyclable parts according the production demand by referring to the production demand information and the recyclable part availability information, generate a procurement plan on parts and materials that cannot be fully supplied from available, recyclable parts alone, and generate a production plan based on the disassembly and procurement plans.

6. A disassembly plan generation method for creating a disassembly plan to disassemble collected, used products, the method comprising the steps of:
   storing collection schedule information on each used product and a recyclable part table showing recyclable parts contained in each used product;
   storing production demand information on products to be manufactured by using the recyclable parts;
   generating recyclable part availability information by referring to the collection schedule information and the recyclable part table; and
   generating a recyclable part disassembly plan according to a production demand by referring to the production demand information and the recyclable part availability information.

7. A disassembly plan generation method according to claim 6, wherein those recyclable parts which, when used for the manufacture of a product, have an exclusion relation with each other in the recyclable part table are related to each other and the recyclable part availability information is managed based on the exclusion relation.

8. A procurement plan generation method for creating a procurement plan on parts and materials for products to be manufactured, the method comprising the steps of:
   storing production demand information on products to be manufactured, collection schedule information on individual used products, and a recyclable part table showing recyclable parts contained in the used products;
   generating recyclable part availability information by referring to the collection schedule information and the recyclable part table; and
   generating a procurement plan on parts and materials that cannot be fully supplied from available, recyclable parts alone by referring to the production demand information and the recyclable part availability information.

9. A disassembly plan generation method according to claim 8, wherein those recyclable parts which, when used for the manufacture of a product, have an exclusion relation with each other in the recyclable part table are related to each other and the recyclable part availability information is managed based on the exclusion relation.

10. A production, procurement and disassembly plan generation method for creating production, procurement and disassembly plans on recyclable products, the method comprising the steps of:

storing production demand information on products to be manufactured, collection schedule information on individual used products, and a recyclable part table showing recyclable parts contained in the used products;

generating and storing recyclable part availability information by referring to the collection schedule information and the recyclable part table;

generating a recyclable part disassembly plan according to the production demand by referring to the production demand information and the recyclable part availability information, generating a procurement plan on parts and materials that cannot be fully supplied from the available, recyclable parts alone, and generating a production plan based on the disassembly and procurement plans.

* * * * *